US009842564B2

(12) United States Patent
Shao et al.

(10) Patent No.: US 9,842,564 B2
(45) Date of Patent: Dec. 12, 2017

(54) METHOD AND SYSTEM FOR WIRELESS VIDEO TRANSMISSION VIA DIFFERENT INTERFACES

(75) Inventors: Huai-Rong Shao, San Jose, CA (US); Ju-Lan Hsu, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 13/283,289

(22) Filed: Oct. 27, 2011

(65) Prior Publication Data

US 2012/0133828 A1 May 31, 2012

Related U.S. Application Data

(60) Provisional application No. 61/407,868, filed on Oct. 28, 2010, provisional application No. 61/408,520, filed on Oct. 29, 2010.

(51) Int. Cl.
*H04N 7/01* (2006.01)
*H04N 21/4363* (2011.01)
(Continued)

(52) U.S. Cl.
CPC ........... *G09G 5/006* (2013.01); *G06F 3/1454* (2013.01); *G06F 13/385* (2013.01);
(Continued)

(58) Field of Classification Search
CPC ............. H04N 7/01; H04N 2201/0065; H04N 21/43632; H04N 19/40; G06F 13/385
(Continued)

(56) References Cited

U.S. PATENT DOCUMENTS 7,499,462 B2 3/2009 MacMullan et al.
8,228,262 B2 7/2012 Unger
(Continued)

FOREIGN PATENT DOCUMENTS

CN 1909696 A 2/2007
CN 101053165 A 10/2007
(Continued)

OTHER PUBLICATIONS

Gefen Inc., Gefen TV Wireless VGA Extender LR GTV-WVGA-LR User Manual, 2009, Gefen Inc., pp. 4-7.*
(Continued)

*Primary Examiner* — Benjamin R Bruckart
*Assistant Examiner* — Jason Thomas
(74) *Attorney, Agent, or Firm* — Sherman IP LLP; Kenneth L. Sherman; Steven Laut (57) ABSTRACT

A method and system is provided for wireless transmission of audio/video information via different wired AV interface formats. A method and system for wireless communication of audio/video AV information between AV devices includes receiving audio/video (AV) information from a first AV module via a first wired AV interface in a first AV device, applying interface dependent processing to the AV information, and transmitting the processed AV information from a wireless transceiver over a wireless channel to a wireless receiver of a second AV device. The second AV device includes a second wired AV interface and the first AV interface is of a different type than the second interface device.

36 Claims, 11 Drawing Sheets

(51) Int. Cl.
*H04N 19/40* (2014.01)
*G06F 13/38* (2006.01)
*H04L 29/06* (2006.01)
*H04W 92/02* (2009.01)
*G09G 5/00* (2006.01)
*G06F 3/14* (2006.01)

(52) U.S. Cl.
CPC ............ *H04L 65/1023* (2013.01); *H04N 7/01* (2013.01); *H04N 19/40* (2014.11); *H04N 21/43632* (2013.01); *G09G 2370/10* (2013.01); *G09G 2370/12* (2013.01); *G09G 2370/16* (2013.01); *H04W 92/02* (2013.01)

(58) Field of Classification Search
USPC .......... 725/74, 78, 80, 81, 85; 375/219, 220, 375/295, 299, 316, 377
See application file for complete search history.

(56) References Cited

U.S. PATENT DOCUMENTS

| | | | |
|---|---|---|---|
| 8,514,208 | B2 | 8/2013 | Champion et al. |
| 2004/0049797 | A1* | 3/2004 | Salmonsen .................... 725/132 |
| 2006/0092893 | A1 | 5/2006 | Champion et al. |
| 2006/0209745 | A1 | 9/2006 | MacMullan et al. |
| 2008/0089667 | A1 | 4/2008 | Grady et al. |
| 2008/0168519 | A1* | 7/2008 | Rao et al. ...................... 725/127 |
| 2008/0263621 | A1 | 10/2008 | Austerlitz et al. |
| 2009/0066704 | A1 | 3/2009 | Daniel et al. |
| 2009/0260043 | A1* | 10/2009 | Tatsuta et al. ................... 725/81 |
| 2010/0036983 | A1* | 2/2010 | Utz et al. ....................... 710/104 |
| 2010/0111145 | A1* | 5/2010 | Trachewsky et al. ......... 375/220 |
| 2010/0265392 | A1 | 10/2010 | Shao et al. |
| 2011/0149796 | A1* | 6/2011 | Qu et al. ........................ 370/254 |
| 2012/0063376 | A1* | 3/2012 | Kambhatla et al. ........... 370/310 |

FOREIGN PATENT DOCUMENTS

| | | |
|---|---|---|
| JP | 2008519548 A | 6/2008 |
| JP | 2008533913 A | 8/2008 |
| WO | 2008072848 A1 | 6/2008 |
| WO | 2009046347 A1 | 4/2009 |
| WO | 2010087189 A1 | 8/2010 |

OTHER PUBLICATIONS

International Search Report and Written Opinion dated May 30, 2012 for International Application No. PCT/KR2011/008163 from Korean Intellectual Property Office, pp. 1-9, Seo-gu, Daejeon, Republic of Korea.

Macity, "this photo is part of a gallery of www.macitynet.it", Jun. 20, 2010, pp. 1-2, Macity Publishing Ltd., Italy [English-language translation attached, pp. 1-2].

Mexican Office Action dated Jun. 27, 2013 for Mexican Application No. MX/a/2013/004401 from Instituto Mexicano de la Propiedad Industrial, pp. 1-5, Jardines del Pedregal, Mexico, (English-language translation pp. 4-5).

Mexican Office Action dated Dec. 5, 2013 for Mexican Application No. MX/a/2013/004401 from Instituto Mexicano de la Propiedad Industrial, pp. 1-9, Jardines del Pedregal, Mexico, (Machine-generated English-language translation pp. 1-6).

European Search Report dated Jan. 29, 2015 for European Application No. 11836672.3 from European Patent Office, pp. 1-9, Munich, Germany.

Japanese Office Action dated May 19, 2015 for Japanese Application No. 2013-536532 from Japan Patent Office, pp. 1-6, Tokyo, Japan (Machine generated English-language translation included, pp. 3-6).

Chinese Office Action date Jun. 16, 2015 for Chinese Application No. 201180051912.6 from People's Republic of China State Intellectual Property Office, pp. 1-29, Beijing, China (Machine generated English-language translation included, pp. 11-29).

Chinese Office Action date Feb. 14, 2016 for Chinese Application No. 201180051912.6 from People's Republic of China State Intellectual Property Office, pp. 1-27, Beijing, China (Machine generated English-language translation included, pp. 13-27).

* cited by examiner

METHOD AND SYSTEM FOR WIRELESS VIDEO TRANSMISSION VIA DIFFERENT INTERFACES

CROSS-REFERENCE TO RELATED APPLICATIONS

This application claims the benefit of U.S. Provisional Patent Application Ser. No. 61/407,868, filed Oct. 28, 2010, incorporated herein by reference. This application further claims the benefit of U.S. Provisional Patent Application Ser. No. 61/408,520, filed Oct. 29, 2010, incorporated herein by reference.

FIELD OF THE INVENTION

The present invention relates to wireless audio/video transmission, and in particular, to wireless audio/video transmission across different interfaces.

BACKGROUND OF THE INVENTION

In systems for uncompressed video and audio communication, typically an audio/video (AV) source is connected to a wireless module using a hardware AV interface such as High-Definition Multimedia Interface (HDMI). These systems do not support communication when an AV source and an AV sink use different AV interfaces or different information types such as video, audio and control messages through the same or different interfaces. An example is when a video source is connected to a transmitter through HDMI, which is a compact AV interface for transmitting uncompressed digital data, but the video sink is connected to a receiver through DisplayPort which is a digital display AV interface standard.

BRIEF SUMMARY OF THE INVENTION

Embodiments of the invention relate to wireless transmission of audio/video information via different wired AV interface formats. One embodiment comprises wireless communication of audio/video (AV) information between AV devices, including receiving audio/video (AV) information from a first AV module via a first wired AV interface in a first AV device, applying interface dependent processing to the AV information, and transmitting the processed AV information from a wireless transceiver over a wireless channel to a wireless receiver of a second AV device. The second AV device includes a second wired AV interface and the first AV interface is of a different type than the second interface device.

These and other features, aspects and advantages of the present invention will become understood with reference to the following description, appended claims and accompanying figures.

DETAILED DESCRIPTION OF THE INVENTION

Embodiments of the invention relate to wireless transmission of audio/video information via different AV interface formats. One embodiment of the invention comprises audio/video transmission over wireless communication links with different interfaces connecting a video source and a video sink. An embodiment of the invention provides an interface dependent processing (IDP) controller that provides interface dependent processing, for connecting a video source and a video sink with different AV interfaces, via wireless transceivers.

In one embodiment of the invention, the IDP controller provides interface dependent processing, including: (1) Layer management for receiver or transmitter of one or multiple wired interfaces such as HDMI, DisplayPort or other interfaces, (2) Separation at an AV source, and composition at an AV sink, of different types of information such as video, audio and control data, (3) Conversion, generation and forwarding of AV interface specific information for the AV interfaces, and (4) Support for interaction between the IDP controller and a wireless transceiver (of a source device or a sink device). Examples of AV interfaces include HDMI, DisplayPort, buses, Low-voltage differential signaling (LVDS), Digital Visual Interface (DVI), etc.

In the description of embodiments of the present invention herein, an AV source device (or source device) comprises an AV source and a wireless transceiver. Further, an AV sink device (or sink device) comprises an AV sink and a wireless transceiver. Though embodiments of the invention are described in conjunction with protocol architecture of millimeter-wave (mmW) wireless systems, such as a Wireless Gigabit Alliance (WGA) industry standard layer model, and IEEE 802.11ad, the present invention is not limited to such applications and is useful with other wireless communication systems and wireless local area networks such as IEEE 802.11ac.

Figure 1:
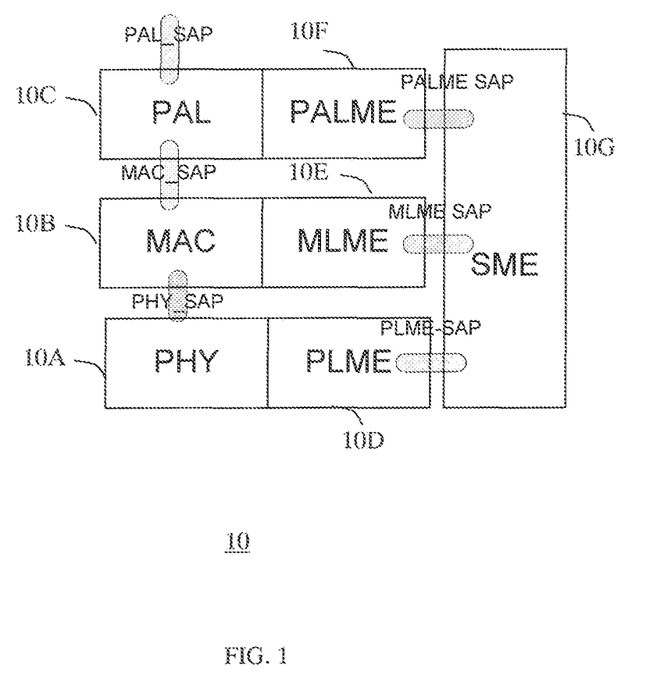
FIG. 1 shows architecture of a wireless transceiver module.

FIG. 1 illustrates architecture of an example mmW wireless transceiver station 10 including a layering module such as a Wireless Gigabit Alliance (WGA) layering model and IEEE 802.11 standards. The layering module includes seven functional entities/layers: physical (PHY) layer 10A, media access control (MAC) layer 10B, a protocol adaptation layer (PAL) 10C, a PHY management entity (PLME) 10D, a MAC management entity (MLME) 10E, a PAL management entity (PALME) 10F and a station management entity (SME) 10G. Because PAL_SAP (PAL service access point) is only a soft or logic interface, the wireless station 10 does not include interaction of a video source and video sink with AV hardware interfaces such as HDMI and DisplayPort. As such, wireless station 10 does not illustrate how an AV source and an AV sink can connect via different AV interfaces, and interact wirelessly.

The architecture in FIG. 1 operates when PAL_SAP is used to connect an AV source or AV sink, and a wireless transceiver when the wireless transceiver module is integrated into the AV source or AV sink, without wired AV interfaces. However, if a wired AV interface such as HDMI or DisplayPort is used to connect an AV source or AV sink to a wireless transceiver, then PAL_SAP does not function because wired interfaces have their own communication protocols and data formats. Further, the architecture in FIG. 1 does not support the case when the AV source and the AV sink use different video interfaces to connect to wireless transceiver modules.

Figure 2:
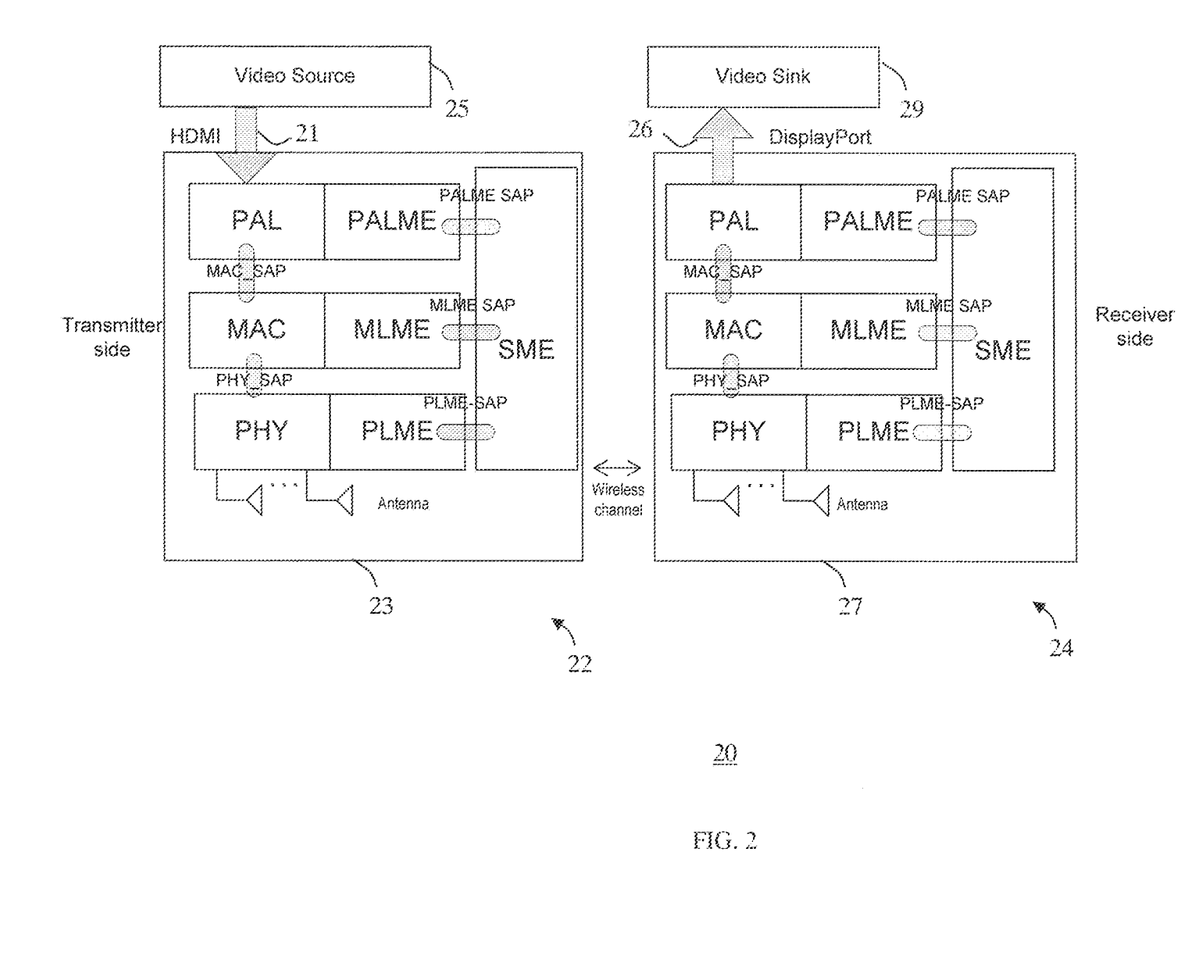
FIG. 2 shows architecture of a wireless communication system.

FIG. 2 shows an example wireless system 20 including an AV source device 22 an AV sink device 24. The source device 22 includes a mmW wireless transceiver module 23 and an AV source 25 (e.g., DVD player providing uncompressed AV data). The sink device 24 includes a mmW wireless transceiver module 27 and an AV sink 29 (e.g., TV, display monitor). In this example, the wireless transceiver module 23 functions as a transmitter, and the wireless transceiver module 27 functions as a receiver, communicating via wireless channels on radio frequencies using directional transmission such as beamforming via multiple antennas.

In the source device 22, the video source 25 is connected to the wireless transmitter module 23 through an HDMI interface 21. In the sink device, the video sink 29 is connected to a wireless receiver 27 via a DisplayPort interface 26. The wireless transmitter 23 does not have a capability to translate between HDMI and DisplayPort protocol control and data formats. As such, the system 20 cannot handle different information types such as video, audio and control messages through the same or different interfaces. For example, audio may use a different wired interface as an input to the wireless transceiver module.

Figure 3A:
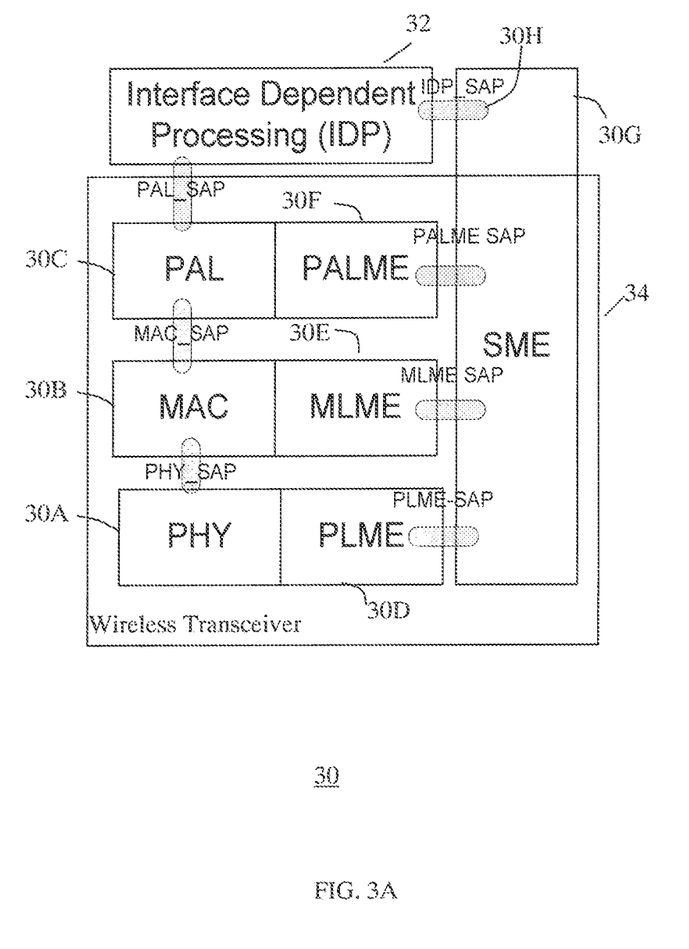
FIG. 3A shows architecture of a wireless AV device, according to an embodiment of the invention.

An embodiment of the invention provides AV data transmission over wireless communication links via different interfaces connecting an AV source and an AV sink. Referring to FIG. 3A, a communication system 30 according to an embodiment of the invention supports different AV interfaces connected to AV modules (e.g., AV source, AV sink), for wireless AV communication. The system 30 includes an IDP controller comprising an IDP layer (IDP module) 32 for a wireless transceiver such as a mmW wireless transceiver 34. The IDP layer 32 provides interface dependent processing as described herein, which allows connecting AV modules with different AV interfaces, via wireless transceivers. A layering model includes seven functional entities/layers: PHY layer 30A, MAC layer 30B, PAL 30C, PLME 30D, MLME 30E, PALME 30F and SME 30G.

The IDP layer 32 interfaces with the SME 30G and utilizes an interface dependent processing service access point (IDP_SAP) interface 30H for communication with the SME 30G. The IDP_SAP is added to ensure the IDP layer can interact with the SME.

Unlike wired applications where AV source and AV sink are directly connected through cables such as HDMI cables, according to embodiments of the invention a first AV module such as an AV source is connected to a wireless transceiver module with a wired AV interface, and a second AV module such as an AV sink is connected to a wireless transceiver module with a wired AV interface. The wireless transceiver modules then communicate via wireless channels.

As shown in FIG. 3A, an embodiment of the invention provides support for interaction between the IDP layer 32 and the wireless transceiver module 34, at a source side. According to the embodiments of the present invention, the IDP layer 32 uses the PAL_SAP and IDP_SAP interfaces to interact with the PAL layer and the SME, respectively, of the system 30. PAL_SAP is mainly used for audio/video data information exchange between the IDP 32 and the PAL layer 30C. PAL_SAP may also be used to for control information which is transparent to wireless transceiver module (i.e., the PAL layer need not know the meaning of the control information from the IDP layer 32).

For example, the IDP layer 32 can pass certain CEO control messages through PAL_SAP and the CEO messages are transparent to the PAL layer. IDP_SAP 30H is used for control/management information exchange between the IDP layer 32 and the SME 34, according to the embodiments of the present invention. The SME 34 is configured to understand the meaning of the control/management information from IDP before taking further action, according to the embodiments of the present invention.

In one embodiment of the invention, the IDP layer 32 provides interface dependent processing as follows. The IDP layer 32 communicates with an AV module (e.g., AV source) using a wired interface such as HDMI, DisplayPort or other interfaces or buses. The receiver and/or transmitter of wired interfaces may be included in the IDP layer 32. The same or different interfaces can be used for video, audio and control data.

Figure 3B:
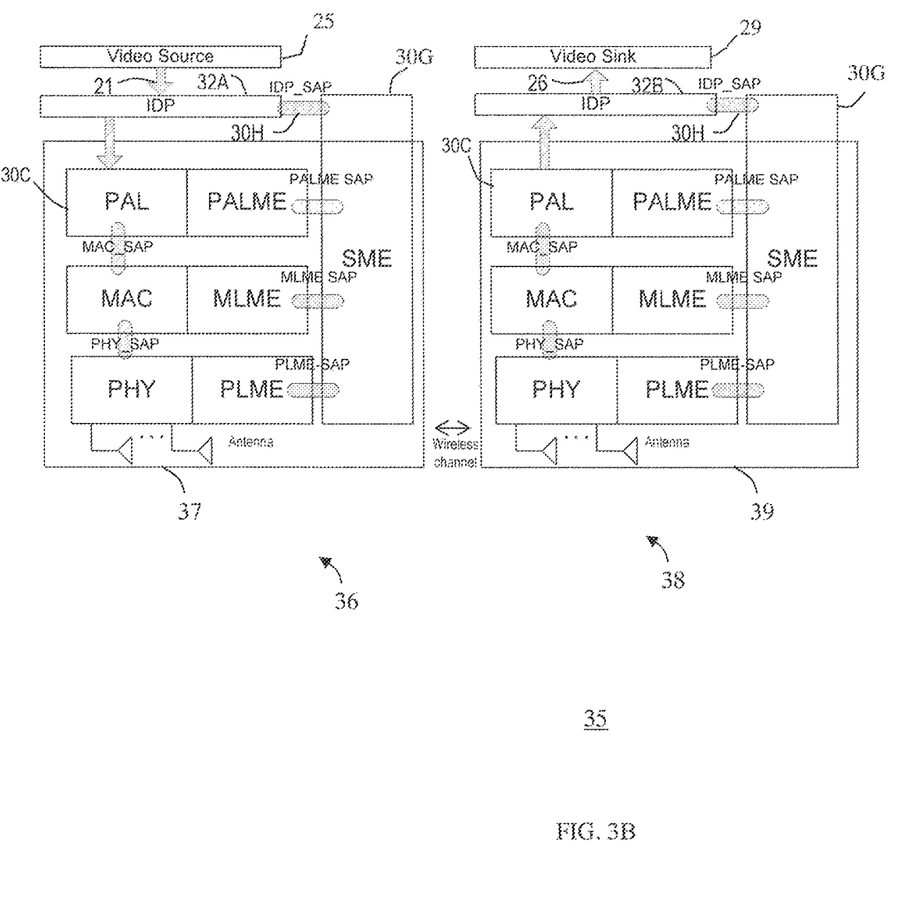
FIG. 3B shows a wireless communication system based on wireless AV devices as in FIG. 3A, according to an embodiment of the invention.

According to an embodiment of the invention, an IDP controller includes an IDP layer at an AV source and an IDP layer at an AV sink, providing interface dependent processing which allows AV data communication between the AV source and the AV sink using different AV interfaces at the AV source and the AV sink, over wireless communication links, such as shown by example in FIG. 3B.

Referring the FIG. 3B, according to an embodiment of the invention, an example wireless system 35 includes an AV source device 36 and an AV sink device 38. In the source device 36, the video source 25 is connected to a wireless transmitter module 37 through an AV interface 21, via an IDP layer 32A. In the sink device 38, the video sink 29 is connected to a wireless receiver module 39 through an AV interface 26, via an IDP 32B. In this embodiment, said IDP controller comprises the IDP layer 32A and the IDP layer 32B.

In one embodiment of the invention, the sink IDP layer 32B provides the reverse function of source IDP layer 32A. For example, IDB 32B reconstructs the HDMI frame structure by placing audio and control data into the data islands of the HDMI frame for HDMI hardware interface case. In one example the AV interface 21 comprises HDMI and the AV interface 26 comprises DisplayPort. Each of the devices 36 and 39 utilizes the architecture of the communication system 30 (FIG. 3A), according to an embodiment of the invention.

Figure 4:
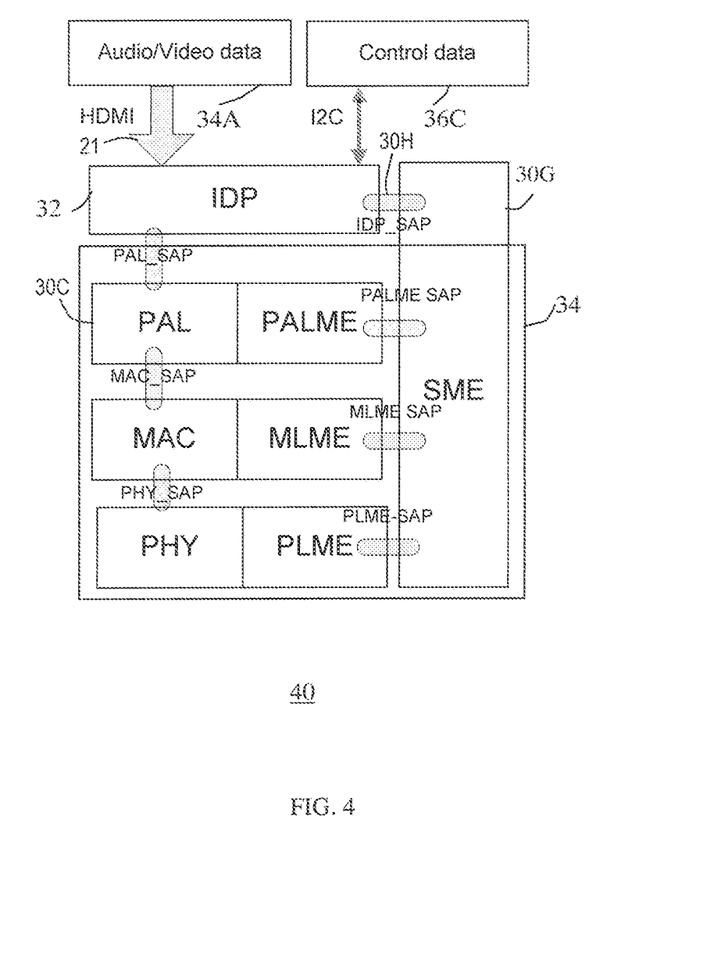
FIG. 4 shows a wireless AV device with interface dependent processing, according to an embodiment of the invention.

FIG. 4 shows a wireless communication system 40 according to an embodiment of the invention, wherein AV data is transmitted between an AV module and the IDP layer 32, such as in an AV source device. In this example, both audio and video (Audio/Video data) 34A are transmitted to the IDP layer 32 through an HDMI interface 21. Audio is transmitted in data islands during video horizontal/vertical (H/V) blanking periods of HDMI frames. Certain control data 36C is also transmitted in data islands during the H/V blanking periods of HDMI frames. Certain other control information such as CEC messages are transmitted via a separate interface such as I²C (Inter-Integrate Circuit). As such, HDMI interface is used as interface for both audio and video data. The wireless transmitter 34 then transmits information to a wireless receiver of another AV device.

Figure 5:
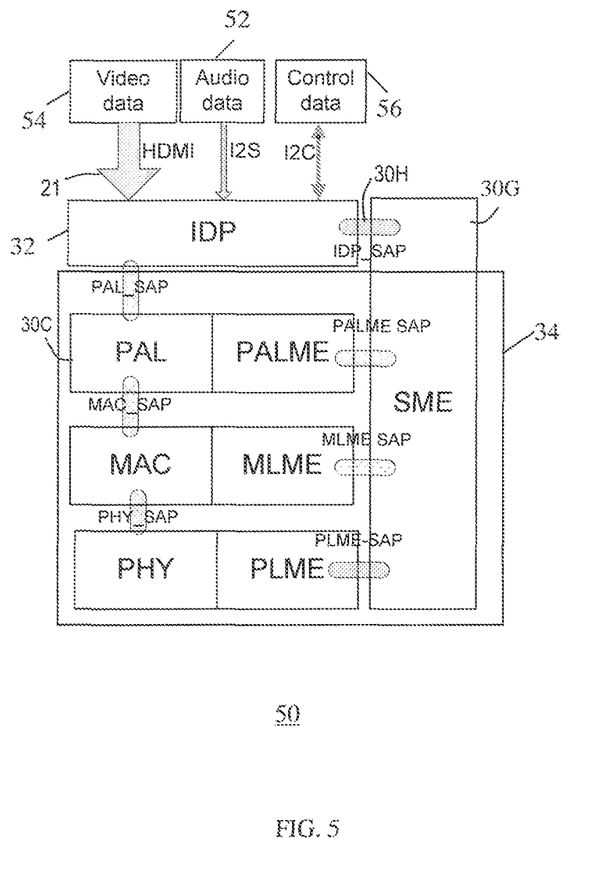
FIG. 5 shows a wireless AV device with interface dependent processing, according to another embodiment of the invention.

FIG. 5 shows another example system 50 according to an embodiment of the invention, wherein audio data 52 is transmitted to the IDP layer 32 through I²S (Integrated Interchip Sound) interface, video data 54 is transmitted through HDMI interface 21, and control data 56 is transmitted via I²S interface (a serial bus interface standard for connecting digital audio devices). The IDP layer 32 provides interface dependent processing based on the data. In this example, video data 54 is transmitted to the IDP layer 32 through an HDMI interface 21. Audio data 52 is transmitted to the IDP layer 32 through an I²S interface. Certain control data 56 is also transmitted in data islands during the H/V blanking periods of HDMI frames. Certain other control information such as CEC messages are transmitted via a separate interface such as I²C (Inter-Integrate Circuit). The wireless transmitter 34 then transmits information to a wireless receiver of another AV device.

Figure 6:
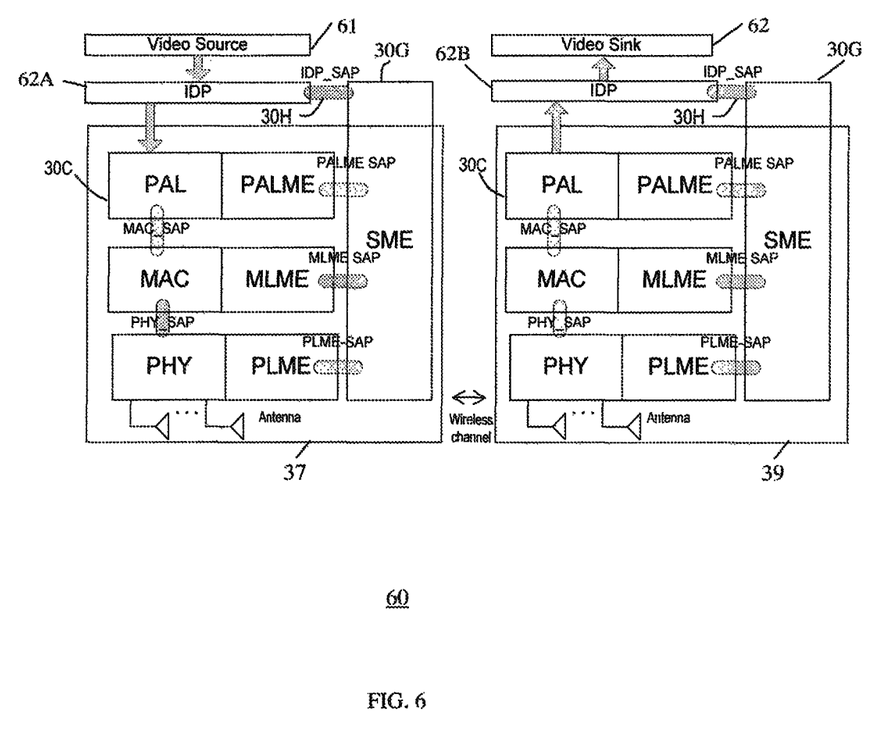
FIG. 6 shows a wireless communication system based on wireless AV devices, according to an embodiment of the invention.

FIG. 6 shows another example system 60 according to an embodiment of the invention, wherein an IDP controller comprising a source IDP layer 62A and sink IDP layer 62B, provides interface dependent processing which includes separation (at the source device), and composition (at the sink device), of different types of AV information. In one example, when different types of information are transmitted by a video source 61 through the same AV interface, they are separated at the source IDP layer 62A in order to be further processed at the PAL layer 30C of the wireless transceiver module 37 at the transmitter side. For example, if audio and control data are transmitted within the data islands of HDMI frames to the IDP layer 62A, then the IDP layer 62A extracts audio, video and control information from HDMI frames and passes them to PAL layer 30C of wireless module 37 separately. AV information may include, for example, compressed video, uncompressed or compressed audio and control data.

At the receiver side, different types of AV information are composed together. In one embodiment of the invention, the PAL layer 30C of the wireless transceiver module 39 recreates HDMI frames by placing audio and control information into the data islands of the HDMI frame, and placing the video information into the active video area of the HDMI frame, and sending the HDMI frames to the video sink 61 through a HDMI interface. The sink IDP layer 62B provides the reverse function of source IDP 62A. For example, IDP layer 62B reconstructs the HDMI frame structure by placing audio and control data into the data islands of the HDMI frame for HDMI hardware interface case.

Referring back to FIG. 3A, according to embodiments of the invention, the IDP at a transmitter or receiver provides interface dependent processing including conversion, generation and forwarding interface specific information. For example, the IDP layer 32 in FIG. 3A forwards related control information and also AV data to ensure the AV source and AV sink can communicate with each other via respective wireless transceivers over a wireless channel. Since the format of control and audio/video data information through the wired interface is different from the packet format through the wireless channel, the IDP layer 32 provides format conversion before forwarding information to the transceiver 34.

As noted, in one example, the video source and the video sink use different types of AV interfaces (e.g., HDMI at the video source, DisplayPort at the video sink). In one embodiment, the IDP layer at the transmitter or the IDP layer at the receiver converts the control and audio/video data information from one AV interface type to the other AV interface. Three examples of such conversion according to embodiments of the invention are provided below. In one example, the IDP layer at the transmitter device (e.g., AV source) with an HDMI interface is informed that a receiver device (e.g., AV sink) uses DisplayPort, by capability exchange signaling at the SME between the transmitter and receiver.

In a first example, such conversion by the IDP is performed before the information is transmitted on the wireless channel at the transmitter side. For example, in the system 60 in FIG. 6, if the video source 61 needs to send certain HDMI control information to the video sink 62, the IDP layer 62A at the video source side can converts e.g. HDMI control information to corresponding e.g. DisplayPort control information format before the information is packetized and transmitted by the transmitter 37 on the wireless channel to the receiver 39. The IDP layer 62B provides reverse operation of the IDP layer 62A.

In a second example, such conversion by the IDP is performed after the information is transmitted on the wireless channel from the transmitter but before passing the information to the wired interface at the receiver other side. For example, in FIG. 6, if the video source 61 needs to send certain HDMI control information to the video sink 62, the IDP layer 62A at the video source side packetizes the HDMI control information and the transmitter 37 transmits the packets on the wireless channel to the receiver 39. Then, at the video sink side, the IDP layer 62B coverts the HDMI control information to the corresponding DisplayPort control information format before forwarding the information to the DisplayPort interface for the video sink 62.

In a third example, the IDP for the transmitter side always converts interface-dependent control and audio/video data information, before transmitting the information on the wireless channel from the transmitter side. Then on the receiver side, upon receiving the interface-independent information from the wireless channel, the IDP for receiver side always converts interface-independent information to the interface-dependent information before passing the information to the wired interface for the video sink.

For example, in the system of FIG. 6, if the video source 61 needs to send certain HDMI control information to the video sink 62, the IDP layer 62A at the video source side converts the information to generalized control information packet format and transmits the generalized control packets on the wireless channel. The at the receiver side, the IDP layer 62B coverts the generalized control packets to the corresponding DisplayPort control information format before forwarding the information to the DisplayPort interface for the video sink 62.

Figure 7:
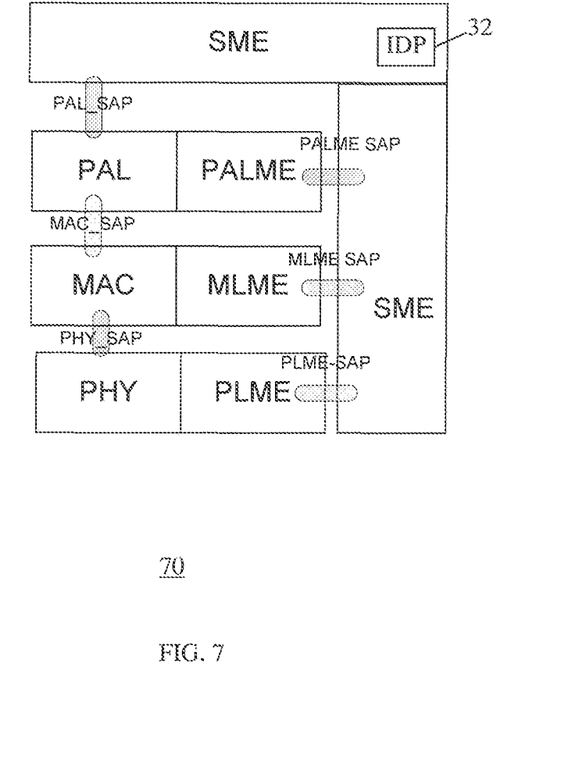
FIG. 7 shows an interface dependent processing implementation, according to an embodiment of the invention.
Figure 8:
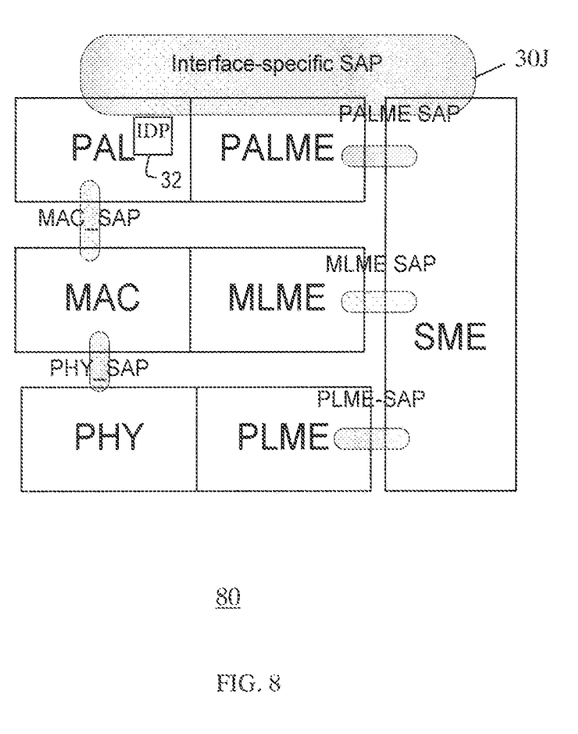
FIG. 8 shows an interface dependent processing implementation, according to another embodiment of the invention.

FIG. 7 shows architecture of a wireless communication system 70 according to an embodiment of the invention, wherein functions of the IDP layer 32 are implemented in the SME of a wireless transceiver for an AV module, for providing layer management, as described hereinabove. FIG. 8 shows architecture of a wireless system 80 according to an embodiment of the invention, wherein functions of the IDP layer 32 are implemented by the PAL layer of a wireless transceiver for an AV module, as described hereinabove. In this example, interface-specific SAP 30J replaces PAL_SAP 30H in order to support various hardware interfaces between the video source or sink and the wireless module. In addition, the PAL layer is responsible for the functions of the IDP for providing layer management.

Figure 9:
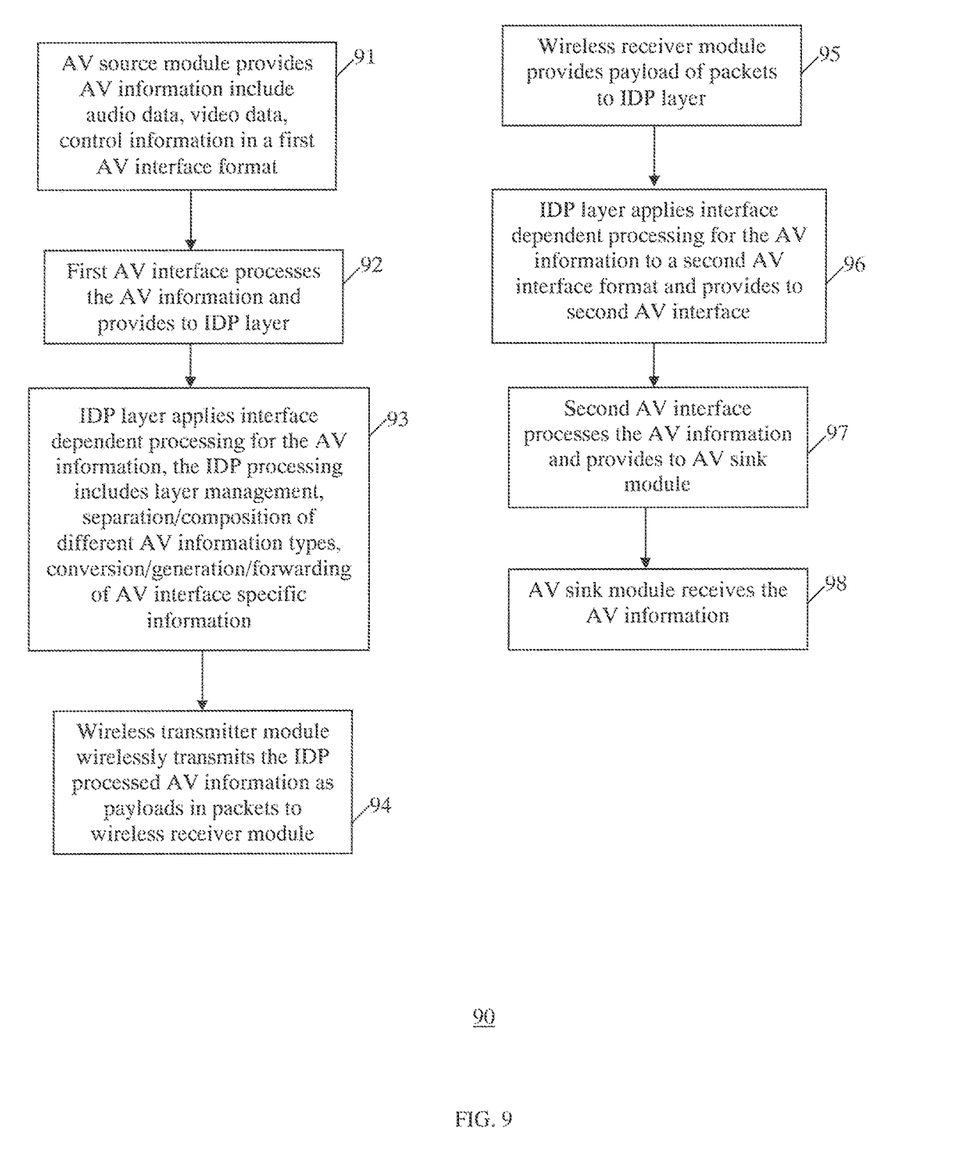
FIG. 9 shows a flowchart of a process for wireless AV information communication, according to an embodiment of the invention.

FIG. 9 shows a flowchart of a wireless communication process 90, in conjunction with a wireless system such as the system in FIG. 3B, according to an embodiment of the invention. The process 90 includes the following processing blocks:

At AV Source Side:
- Block 91: AV source module provides AV information include audio data, video data, control information in a first AV interface format.
- Block 92: First AV interface processes the AV information and provides to IDP layer.
- Block 93: IDP layer applies interface dependent processing for the AV information, as needed. As described herein, the IDP processing includes layer management, separation/composition of different AV information types, conversion/generation/forwarding of AV interface specific information.
- Block 94: Wireless transmitter module wirelessly transmits the IDP processed AV information as payloads in packets to wireless receiver module.

At AV Sink Side:
- Block 95: Wireless receiver module provides payload of packets to IDP layer.
- Block 96: IDP layer applies interface dependent processing for the AV information to a second AV interface format and provides to second AV interface, as needed.
- Block 97: Second AV interface processes the AV information and provides to AV sink module.
- Block 98: AV sink module receives the AV information.

Embodiments of the invention provide an interface dependent processing (IDP) layer that supports the case when the AV source and the AV sink use different video interfaces to connect to wireless transceivers for AV data communication. The IDP layer further supports different AV information types such as video, audio and control messages through the same or different AV interfaces. The IDP provides signal processing functions for wireless transmission. Such signal processing functions include support of the interaction between the IDP and the wireless transceiver module. Such signal processing functions further include separation and composition of different types of information such as video, audio and control data.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 10:
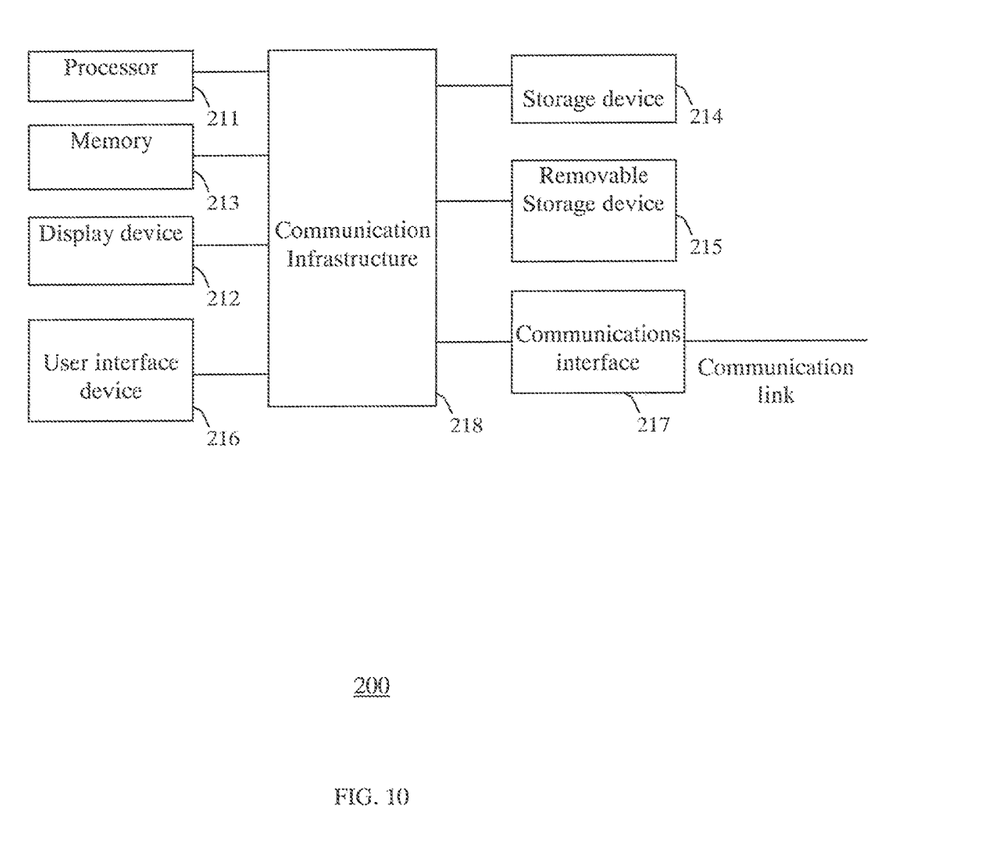
FIG. 10 is a high level block diagram showing an information processing system comprising a computer system useful for implementing an embodiment of the invention.

FIG. 10 is a high level block diagram showing an information processing system comprising a computer system 200 useful for implementing an embodiment of the present invention. The computer system 200 includes one or more processors 211, and can further include an electronic display device 212 (for displaying graphics, text, and other data), a main memory 213 (e.g., random access memory (RAM)), storage device 214 (e.g., hard disk drive), removable storage device 215 (e.g., removable storage drive, removable memory module, a magnetic tape drive, optical disk drive, computer readable medium having stored therein computer software and/or data), user interface device 216 (e.g., keyboard, touch screen, keypad, pointing device), and a communication interface 217 (e.g., modem, a network interface (such as an Ethernet card), a communications port, or a PCMCIA slot and card). The communication interface 217 allows software and data to be transferred between the computer system and external devices. The system 200 further includes a communications infrastructure 218 (e.g., a communications bus, cross-over bar, or network) to which the aforementioned devices/modules 211 through 217 are connected.

Information transferred via communications interface 217 may be in the form of signals such as electronic, electromagnetic, optical, or other signals capable of being received by communications interface 217, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication of audio/video (AV) information between AV devices, comprising:
   receiving AV information from a first AV interface via a first wired AV interface in a first AV device;
   performing interface dependent processing on the AV information that comprises separation of AV information into audio data, video data and interface specific control data for a first AV interface type, and conversion of the interface specific control data, the audio data and the video data, wherein the interface specific control data is converted to interface-independent control information;
   converting a first packet format to a second packet format for packetizing the audio data, the video data and the interface-independent control information; and
   transmitting the audio data, the video data and the interface-independent control information in the second packet format over a wireless channel to a wireless receiver of a second AV device including a second wired AV interface for a second AV interface type that is a different type of AV wired interface from the first AV interface type;
   wherein:
   the audio data, video data and the interface-independent control information are transmitted from a wireless transceiver over the wireless channel;
   a first portion of the interface-independent control information is transmitted in data islands during horizontal and vertical blanking periods in one or more frames; and
   a second portion of the interface-independent control information is transmitted via an inter-integrated circuit ($I^2C$) interface or an integrated interchip sound ($I^2S$) interface.

2. The method of claim 1, wherein a first interface dependent processing (IDP) layer connects the first AV device to the wireless transceiver, a second IDP layer couples the second AV device to the wireless receiver, and an IDP controller comprising the first IDP layer and the second IDP layer provides processing for wirelessly communicating the AV information between the first AV device and the second AV device.

3. The method of claim 2, wherein the conversion comprises converting the audio data, the video data and the interface-independent control information to AV data for the second AV device for the second wired AV interface type.

4. The method of claim 3, wherein converting of the audio data, the video data and the interface independent control information to the AV data for the second wired AV interface type and the converting from the first packet format to the second packet format is performed before transmitting the interface-independent control information on the wireless channel from the first AV device to the second AV device.

5. The method of claim 2, further comprising:
   performing IDP on the AV information at the first IDP layer;
   wherein:
   the first IDP layer utilizing an IDP service access point (IDP_SAP) interface to interact with a station management entity (SME) of the first AV device; and
   the first IDP layer utilizing a protocol adaptation layer service access point (PAL_SAP) interface to interact with a protocol adaptation layer (PAL) of the first AV device.

6. The method of claim 5, wherein:
   the IDP_SAP interface is used for control/management information exchange between the first IDP layer and the SME, wherein the SME is configured to handle control/management information from the first IDP layer; and
   PAL_SAP interface is used for audio/video data information exchange between the first IDP layer and the PAL.

7. The method of claim 1, wherein:
   when different types of AV information are received via the first wired AV interface, the separation of AV information comprises providing, upon separation, the audio data, video data and the interface specific control data to a protocol adaptation layer of the wireless transceiver for processing.

8. The method of claim 7, wherein the conversion of the interface specific control data, the audio data and the video data ensures communication between the first AV device and the second AV device over the wireless channel.

9. The method of claim 7, further comprising:
   causing conversion of the interface-independent control information to corresponding interface-dependent control information for the second AV device; and
   causing composition of AV information from the transmitted interface-independent control information, the audio data and the video data at a protocol adaptation layer of the wireless receiver of the second AV device, wherein the composition is based on placing the audio data and the first portion of the interface-independent control information into data islands of one or more high-definition multimedia interface (HDMI) frames and placing the video data into a video area of the one or more HDMI frames and providing the one or more HDMI frames to a second AV interface via the second wired AV interface at the second AV device.

10. The method of claim 7, wherein the different types of AV information include compressed video, uncompressed or compressed audio and control data.

11. The method of claim 1, further comprising:
    packetizing the audio data, the video data and the corresponding interface-dependent control information from the second packet format to the first packet format after the converting of the interface-independent control information to the corresponding interface-dependent control information for the second AV device.

12. The method of claim 1, wherein each AV device comprises a mmW wireless transceiver.

13. The method of claim 1, wherein the AV information comprises uncompressed video information.

14. The method of claim 1, further comprising:
    performing interface dependent processing at a station management entity (SME) of the first AV device.

15. The method of claim 1, further comprising:
performing interface dependent processing at protocol adaptation layer (PAL) of the first AV device; and
utilizing interface-specific service access point interfaces for interaction with a station management entity (SME), the PAL and a PAL management entity (PALME) of the first AV device.

16. The method of claim 1, wherein the first wired AV interface uses first interface specific information and the second wired AV interface uses second interface specific information.

17. The method of claim 16, wherein the first interface specific information includes different data format and control data for the AV information than the second interface specific information.

18. A wireless system for wireless communication of audio/video (AV) information, comprising:
a first AV device having a transceiver for wireless communication; and
an independent interface processing (IDP) controller that receives AV information from a first AV interface via a first wired AV interface in the first AV device, wherein the IDP controller performs interface dependent processing on the AV information that comprises separation of AV information into audio data, video data and interface specific control data for the first wired AV interface, and conversion of the audio data, the video data and the interface specific control data, the interface specific control data is converted to interface-independent control information, and the IDP controller converts a first packet format to a second packet format for packetizing the audio data, the video data and the interface-independent control information and provides the audio data, the video data and the interface-independent control information in the second packet format to the transceiver of the first AV device for wireless transmission;
wherein:
the audio data, video data and the interface-independent control information are transmitted from the wireless transceiver of the first AV device over the wireless channel;
a first portion of the interface-independent control information is transmitted in data islands during horizontal and vertical blanking periods in one or more frames; and
a second portion of the interface-independent control information is transmitted via an inter-integrated circuit (I²C) interface or an integrated interchip sound (I²S) interface.

19. The system of claim 18, wherein the IDP controller comprises a first IDP layer coupled to the first AV device, and the IDP controller provides processing for wirelessly communicating the AV information between the first AV device and a second AV device having a second wired AV interface, wherein the first wired AV interface is a different interface type than the second wired AV interface.

20. The system of claim 19, wherein:
when differing types of AV information are received via the first wired AV interface, the IDP controller performs the separation of the AV information and provides the audio data, and the video data and the interface specific control data to a protocol adaptation layer of the first AV device for processing.

21. The system of claim 20, wherein:
the IDP controller causes conversion of the interface-independent control information to corresponding interface-dependent control information for the second AV device;
the second AV device includes the second wired AV interface that uses different format for the AV information than the first wired AV interface; and
the conversion of the audio data, the video data and the interface specific control data ensures the first AV device and the second AV device are able to communicate over the wireless channel.

22. The system of claim 20, wherein:
a protocol adaptation layer of the second AV device reconstructs a frame structure from the audio data, the video data and the interface-independent control information received by the second AV device, by placing the audio data and the first portion of the interface-independent control information into data islands of the one or more frames that comprises one or more high-definition multimedia interface (HDMI) frames, and placing the video data into a video area of the one or more HDMI frames and providing the one or more HDMI frames to a second AV interface via the second wired AV interface at the second AV device.

23. The system of claim 20, wherein said differing types of AV information include compressed video, uncompressed or compressed audio and control data.

24. The system of claim 20, further comprising:
an IDP service access point (IDP_SAP) interface, wherein the IDP controller utilizes the IDP_SAP interface to interact with a station management entity (SME); and
a protocol adaptation layer service access point (PAL_SAP) interface, wherein the IDP controller utilizes the PAL_SAP interface to interact with a protocol adaptation layer (PAL).

25. The system of claim 24, wherein:
the IDP_SAP interface is used for control/management information exchange between the IDP controller and the SME;
the SME handles control/management information from IDP controller; and
PAL_SAP interface is used for audio/video data information exchange between the IDP controller and the PAL.

26. The system of claim 19, wherein:
the IDP controller converts the audio data, the video data and the interface-independent control information corresponding to an interface type for the second wired AV interface.

27. The system of claim 26, wherein conversion by the IDP controller is performed before transmitting the interface-independent control information on the wireless channel from the first AV device to the second AV device.

28. The system of claim 26, wherein the IDP controller packetizes the audio data, the video data and the corresponding interface-dependent control information from the second packet format to the first packet format after the conversion of the interface-independent control information to the corresponding interface-dependent control information for the second AV device.

29. The system of claim 18, wherein each AV device comprises a mmW wireless transceiver.

30. The system of claim 18, wherein the AV information comprises uncompressed video information.

31. The system of claim 18, wherein the IDP controller performs interface dependent processing at a station management entity (SME).

32. The system of claim 18, wherein the IDP controller performs interface dependent processing at protocol adaptation layer (PAL), and to use interface-specific service access point interfaces for interaction with a station management entity (SME), PAL and a PAL management entity (PALME).

33. A wireless station for wireless communication of audio/video (AV), comprising:
 a wireless transceiver for wireless communication via a wireless channel;
 an AV interface; and
 an independent interface processing (IDP) controller; wherein:
  the IDP controller exchanges audio/video (AV) information with the AV interface via a first wired AV interface;
  the IDP controller exchanges AV information with the wireless transceiver;
  the IDP controller performs interface dependent processing on the exchanged AV information comprising separation of AV information into audio data, video data and interface specific control data, and conversion of the audio data, the video data and the interface specific control data, the interface specific control data is converted to interface-independent control information, the IDP controller converts a first packet format to a second packet format for packetizing the audio data, the video data and the interface-independent control information and communicates the audio data, the video data and the interface-independent control information in the second packet format with a wireless device having a second wired AV interface of a different type than the first wired AV interface;
  the audio data, video data and the interface-independent control information are transmitted from the wireless transceiver over the wireless channel;
  a first portion of the interface-independent control information is transmitted in data islands during horizontal and vertical blanking periods in one or more frames; and
  a second portion of the interface-independent control information is transmitted via an inter-integrated circuit (I²C) interface or an integrated interchip sound (I²S) interface.

34. The wireless station of claim 33, wherein:
 the IDP controller is configured to cause conversion of the interface-independent control information to corresponding interface-dependent control information for the second wired AV interface;
 the second wired AV interface uses different data format and control for the AV information than the first wired AV interface of the wireless station;
 the AV interface comprises an AV source interface; and
 the IDP controller receives AV information from the AV source interface, performs interface dependent processing on the AV information, and provides the audio data, the video data and the interface-independent control information to the wireless transceiver for transmission over the wireless channel to the wireless device for use via the second wired AV interface.

35. The wireless station of claim 34, wherein a first IDP layer connects a first AV device to the wireless transceiver, the IDP controller comprises the first IDP layer and a second IDP layer, and the IDP controller provides the interface dependent processing for wirelessly communicating the audio data, the video data and the interface-independent control information between the first AV device and the second AV device.

36. The wireless station of claim 33, wherein:
 the AV interface comprises an AV sink interface;
 the IDP controller receives AV information from the wireless transceiver based on wireless communication with the wireless device; and
 the IDP controller performs interface dependent processing on the AV information, and provides the audio data, the video data and the interface-independent control information to the AV sink interface.

\* \* \* \* \*